GEORGE B. LUMPKIN.

Improvement in Holdback.

No. 124,144. Patented Feb. 27, 1872.

UNITED STATES PATENT OFFICE.

GEORGE B. LUMPKIN, OF LEXINGTON, GEORGIA.

IMPROVEMENT IN HOLDBACKS.

Specification forming part of Letters Patent No. 124,144, dated February 27, 1872.

Specification describing certain Improvements in Holdbacks for Carriages for Carrying the Holding-Back Straps, invented by GEORGE B. LUMPKIN, of Lexington, county of Oglethorpe and State of Georgia.

I have heretofore obtained Letters Patent for certain devices by means of which the traces by which carriages are drawn are detached automatically whenever the movement of the animals require such detachment for the sake of safety.

Now the object of my present invention is to release automatically the holding-back straps from the hold of the hooks upon the shafts the moment the traces shall have become detached, and thus the carriage will be entirely released from the animal and out of danger from the same. The first part of my invention consists in a block provided with a guide-rod, which slides back and forth longitudinally in an opening in the hook upon the shaft, and which is held up against a square shoulder, by a proper degree of force, by means of a spiral spring, which is coiled around the guide-rod before mentioned, but which will yield and let go the ring on the holding-back strap when the animal moves forward after the detachment of the traces. This block, by its form and position, closes the hook and has to be drawn out against the force of the spring before the ring can be put in or taken out of it. The second part of my invention relates to providing a strap to extend from said ring to the trace; and that strap will perform two offices. First, when the trace becomes detached and the animal moves forward, leaving the carriage behind, it will pull the ring out of the hook. Secondly, it will hold up the trace so that it will not get into the dirt or under the feet of the animal.

Figure 1:
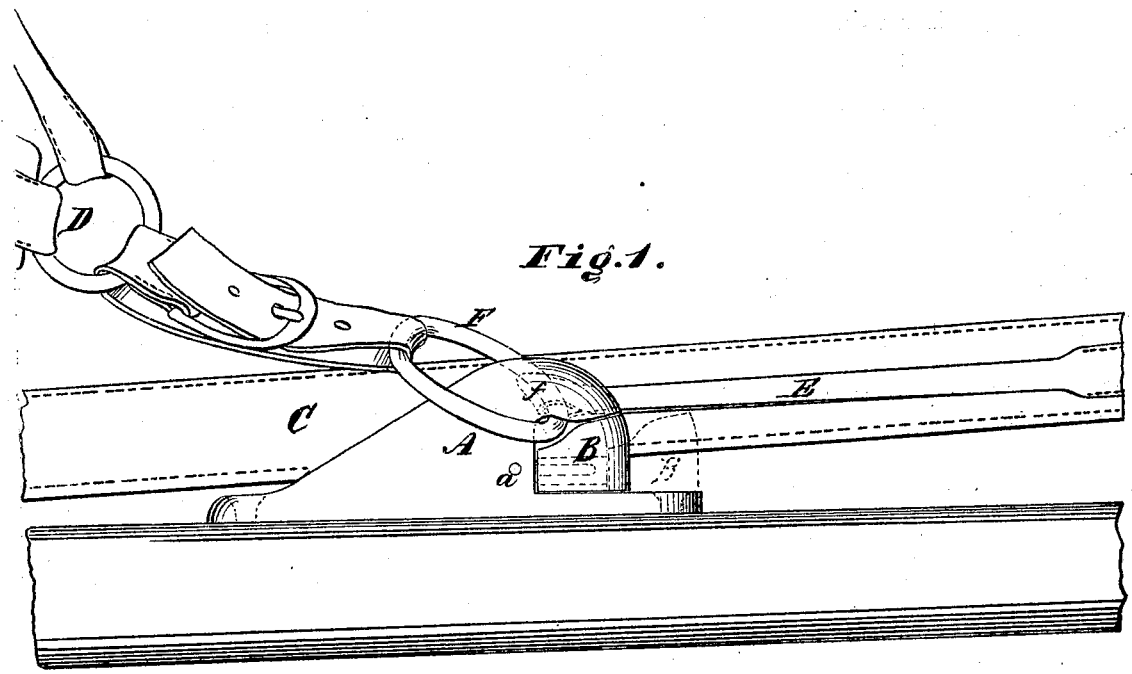
Figure 2:
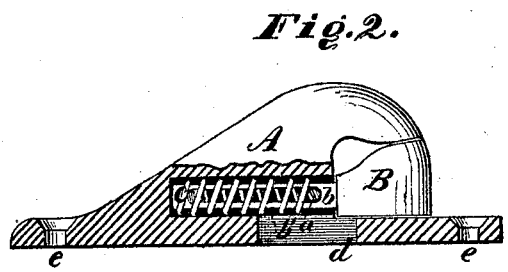

In the accompanying drawing, Figure 1 represents a side view of a shaft, a holding-back strap with its ring, hook, and block. Fig. 2 represents a side view of the hook and block, with a part of the hook cut away so as to display the guide-rod, spring, &c.

In Fig. 1 the block B is shown by black lines in position when closing up the hook A, and by dotted lines in the position it will occupy when the strap E attached to the trace C pulls the ring F forward and out of the hook A. $b$ is the guide-rod, and $b'$ is the slot with which it is provided in order to work over the horizontal pin $a$; and $c$ is the spiral spring before mentioned.

The construction and operation of these improvements are so simple and obvious that further description is unnecessary.

All the parts except the harness and spiral spring $c$ and pin $a$ may be cast of metal, and the whole manufactured at a very small cost.

Claims.

What I claim as my invention is—

1. The combination of the slide-block B with its guide-rod $b$, slot $b'$, guide-pin $a$, and the hook A, constructed and arranged substantially as and for the purpose described.

2. The combination of the described block B, having the spring, slot, and guide-pin, the strap E, and trace C, and ring F, constructed and arranged substantially as shown and described, and for the purpose set forth.

GEO. B. LUMPKIN.

Witnesses:
   H. W. JOHNSON,
   JOEL T. OLIVE.